United States Patent
Distler et al.

(10) Patent No.: US 9,885,382 B2
(45) Date of Patent: *Feb. 6, 2018

(54) ZINC-FREE SPRAY POWDER, COPPER-CONTAINING THERMAL SPRAY LAYER, AS WELL AS METHOD OF MANUFACTURING A COPPER-CONTAINING THERMAL SPRAY LAYER

(71) Applicant: Oerlikon Metco AG, Wohlen, Wohlen (CH)

(72) Inventors: Bernd Distler, Wohlen (CH); Peter Ernst, Stadel b. Niederglatt (CH)

(73) Assignee: OERLIKON METCO AG, WOHLEN, Wohlen (CH)

( * ) Notice: Subject to any disclaimer, the term of this patent is extended or adjusted under 35 U.S.C. 154(b) by 1005 days.

This patent is subject to a terminal disclaimer.

(21) Appl. No.: 13/906,726

(22) Filed: May 31, 2013

(65) Prior Publication Data

US 2013/0319367 A1    Dec. 5, 2013

(30) Foreign Application Priority Data

Jun. 1, 2012   (EP) .................................. 12170426

(51) Int. Cl.
| | | |
|---|---|---|
| C22C 9/00 | (2006.01) | |
| F16C 9/04 | (2006.01) | |
| C23C 4/08 | (2016.01) | |
| C23C 4/12 | (2016.01) | |
| C23C 24/04 | (2006.01) | |
| C23C 30/00 | (2006.01) | |
| F16C 33/00 | (2006.01) | |
| C09D 1/00 | (2006.01) | |
| C23C 24/08 | (2006.01) | |
| F16C 33/14 | (2006.01) | |
| F16C 33/30 | (2006.01) | |
| B23K 35/30 | (2006.01) | |
| F16C 33/12 | (2006.01) | |
| C22C 1/02 | (2006.01) | |
| C22C 9/02 | (2006.01) | |
| C23C 28/02 | (2006.01) | |
| F16C 33/62 | (2006.01) | |

(52) U.S. Cl.
CPC .............. *F16C 9/04* (2013.01); *B23K 35/30* (2013.01); *C09D 1/00* (2013.01); *C22C 1/02* (2013.01); *C22C 9/00* (2013.01); *C22C 9/02* (2013.01); *C23C 4/08* (2013.01); *C23C 4/12* (2013.01); *C23C 24/04* (2013.01); *C23C 24/08* (2013.01); *C23C 28/021* (2013.01); *C23C 28/023* (2013.01); *C23C 30/00* (2013.01); *F16C 33/00* (2013.01); *F16C 33/121* (2013.01); *F16C 33/14* (2013.01); *F16C 33/30* (2013.01); *F16C 33/62* (2013.01); *F16C 2204/34* (2013.01); *F16C 2223/42* (2013.01); *Y10T 428/12479* (2015.01); *Y10T 428/12715* (2015.01); *Y10T 428/12722* (2015.01)

(58) Field of Classification Search
CPC .................................. B22F 1/00; B22F 1/0003
See application file for complete search history.

(56) References Cited

U.S. PATENT DOCUMENTS

| | | | |
|---|---|---|---|
| 2,048,247 A | 7/1936 | Davis | |
| 2,287,884 A | 6/1942 | Jominy | |
| 2,350,398 A | 6/1944 | Hufferd | |
| 4,117,580 A | 10/1978 | Heck | |
| 4,435,448 A | 3/1984 | Nolt | |
| 5,666,644 A * | 9/1997 | Tanaka | ...................... C23C 2/28 384/912 |
| RE35,624 E * | 10/1997 | Kiilunen | ................... C23C 4/04 148/23 |
| 5,692,726 A | 12/1997 | Adachi | |
| 5,958,522 A * | 9/1999 | Nakagawa | ................ C23C 4/08 427/455 |
| 5,968,604 A | 10/1999 | Bischoff-Bogon | |
| 6,189,434 B1 | 2/2001 | Totoda | |
| 6,416,877 B1 | 7/2002 | Perrin | |
| 7,449,249 B2 | 11/2008 | Barbezat | |

(Continued)

FOREIGN PATENT DOCUMENTS

| | | |
|---|---|---|
| CN | 1204373 | 1/1999 |
| CN | 1341157 | 3/2002 |

(Continued)

OTHER PUBLICATIONS

European Search Report of EP patent application 13168661, dated Sep. 2, 2013.

(Continued)

Primary Examiner — Jessee Roe
Assistant Examiner — Ngoclan T Mai
(74) *Attorney, Agent, or Firm* — Greenblum & Bernstein, P.L.C.

(57) ABSTRACT

The invention relates to a zinc-free spray powder for thermally coating a substrate, in particular for thermally coating a bearing part of a bearing apparatus, which spray powder has the following composition except for unavoidable contaminants: tin=5% to 30% weight percent; aluminum=0.1% to 5% weight percent; iron=at most 1% weight percent, and copper=difference to 100% weight percent. The invention furthermore relates to a layer system applied via thermal spraying, a work piece, particularly a connecting rod, as well as a spray method for manufacturing a spray layer.

18 Claims, No Drawings

(56) References Cited

U.S. PATENT DOCUMENTS

| | | | |
|---|---|---|---|
| 8,440,322 B2 | 5/2013 | Suga | |
| 8,636,124 B2 | 1/2014 | Beardsley | |
| 9,097,276 B2* | 8/2015 | Ernst | C09D 1/00 |
| 2003/0049148 A1 | 3/2003 | Takayama et al. | |
| 2006/0063023 A1 | 3/2006 | Barbezat | |
| 2007/0009757 A1* | 1/2007 | Takayama | B22F 1/0003 |
| | | | 428/644 |
| 2008/0145649 A1* | 6/2008 | Mannem | C10M 111/00 |
| | | | 428/336 |
| 2010/0129011 A1 | 5/2010 | Taiho | |
| 2013/0142950 A1 | 6/2013 | Arndt et al. | |
| 2013/0216169 A1 | 8/2013 | Zidar | |
| 2013/0319367 A1 | 12/2013 | Distler | |

FOREIGN PATENT DOCUMENTS

| | | |
|---|---|---|
| DE | 2258295 A1 | 3/1974 |
| DE | 3532706 | 3/1987 |
| DE | 4118469 A1 | 12/1992 |
| DE | 10158622 | 6/2003 |
| DE | 102006060474 A1 | 6/2008 |
| DE | 102007019510 B3 | 9/2008 |
| DE | 102010022597 A1 | 12/2011 |
| EP | 0517191 | 12/1992 |
| EP | 0926340 A2 | 6/1999 |
| EP | 1637623 B1 | 3/2006 |
| EP | 2133580 | 12/2009 |
| GB | 589325 | 6/1947 |
| GB | 2285290 | 7/1995 |
| JP | 49-007106 | 1/1974 |
| JP | 5-339700 | 12/1993 |
| JP | 7-18324 | 1/1995 |
| JP | 2001-335914 | 12/2001 |
| JP | 2002-012960 | 1/2002 |
| JP | 2005-076075 | 3/2005 |
| JP | 2005076075 A | 3/2005 |
| JP | 2005-097704 | 4/2005 |
| JP | 2007-56327 | 3/2007 |
| JP | 2008-256085 | 10/2008 |
| WO | 0023718 A1 | 4/2000 |
| WO | 2007131742 A1 | 11/2007 |
| WO | 2008074281 A2 | 6/2008 |
| WO | 2008131837 A2 | 11/2008 |
| WO | 2010/098382 | 9/2010 |
| WO | 2011127513 A1 | 10/2011 |
| WO | 2012012818 A1 | 2/2012 |

OTHER PUBLICATIONS

JPO Office Action (with English translation) issued in JP 2013-102000 dated Jan. 25, 2017.
EPO Search Report issued in EP 12 17 1373.

* cited by examiner

ZINC-FREE SPRAY POWDER, COPPER-CONTAINING THERMAL SPRAY LAYER, AS WELL AS METHOD OF MANUFACTURING A COPPER-CONTAINING THERMAL SPRAY LAYER

The present application claims priority under 35 U.S.C. §119 of European Patent Application No. 12170426.6 filed on Jun. 1, 2012, the disclosure of which is expressly incorporated by reference herein in its entirety.

The invention relates to a zinc-free spray powder, to a copper-containing surface layer generated with the spray powder, in particular a surface layer on a bearing part of a bearing apparatus, as well as to a method of applying such a surface layer in accordance with the preamble of the independent claim of the respective category.

Bearing apparatuses of all types, for example, plain bearings and rolling element bearings, take up the predominant part of bearings used in the art. The term bearing or bearing apparatus is to be understood in the following as parts which define the function of the bearing, which cooperate in a supporting contact, for example, rolling off or sliding off of each other, or are supported on one another.

The friction that arises at the bearing surfaces cooperating in a supporting contact is generally associated with signs of wear, particularly at the bearing surface. In this connection, plain bearings are used in an almost uncalculable number of embodiments in mechanical engineering. For example, plain bearings are used as crankshaft bearings in reciprocating piston internal combustion engines, as connecting rod bearings, as compression bearings, as crosshead bearings, as propeller shaft bearings, or for many other applications.

For instance, a plain bearing as well as a method for the manufacture of a plain bearing is disclosed in WO 00/23718, in which a coating composed of white metal is alloyed to a bearing composed of iron material. However, the formation of an alloy requires the presence of fluid alloy components, so that a corresponding amount of heat is discharged during the coating process, whereby not only the white metal melts, but also a metal bath composed of melted base material is generated on the contact surface of the bearing part's top side. The melts of white metal and iron material generated in this way can alloy with one another, with a large quantity of $FeSn_2$ forming. In this respect, a comparatively thick connection zone, which is largely composed of $FeSn_2$, correspondingly forms. This connection zone does indeed result in a good metallurgical connection between the base material and the coating; however, $FeSn_2$ represents a very brittle material, so that already for small loads of the known bearing configurations the formation of cracks and brittle failure can result. Furthermore, in the case of inopportune cooling, a transformation of the iron material in the vicinity of the coating to a martensite can take place, which is likewise very brittle, whereby the above mentioned disadvantage is further amplified.

The result is that a corresponding short lifetime occurs for a bearing of the initially described type, due to the high brittleness and low ductility within a relatively thick intermediate region between the steel of the base material and the white metal bearing layer.

In order to avoid this, it is also known to apply a coating composed of a bearing metal, such as white metal to the bearing via centrifugal casting. In this respect, the formation of a metal bath composed of melted base material does indeed not take place. However, during the solidification of the white metal applied during centrifugal casting, a separation of the alloy components can take place, in which needle-shaped crystals composed of $Cu_6Sn_5$ initially and then cubic crystals composed of SbSn form, and finally the remaining tin-rich matrix solidifies.

The density of $Cu_6Sn_5$ is larger and that of SbSn is smaller than the density of the longer liquid matrix. The $Cu_6Sn_5$ crystals correspondingly migrate radially outwards and in this respect weaken the region at which the white metal coating adjoins the base material, which can also negatively impact the lifetime.

To avoid these and related problems, a plain bearing and a method of manufacturing a plain bearing are suggested in WO 2007/131 742 A1, in which a relatively thin connection zone including $FeSn_2$ is formed between the pure white metal layer and the iron-containing base material, which connection zone is at most 10 μm thick.

This solution, however, merely represents a compromise, since the $FeSn_2$ layer is indeed relatively thin, yet it is still present, so that the problem of brittle failure and crack formation is still not definitively solved. Particularly for plain bearings, which are exposed to enormously high loads, such as the crankshaft bearing of internal combustion engines, the problem of brittle failure and crack formation continue to exist because the deformation capability of the plain bearings in accordance with WO 2007/131 742 A1 is still nowhere near sufficient.

In order to fundamentally avoid these problems and to prevent the exchange of the entire bearing in the case of wear at the bearing surfaces, bearing shells are used amongst others for plain bearings, which bearing shells are installed in the bearing and can be exchanged after they are worn out, i.e. so-called divided plain bearings with bearing shells are used. To some extent, the combined storage is also partially used in plain bearings and rolling element bearings. The shafts are generally composed of forged steel or cast iron including spheroidal graphite, the counter parts are formed from tempered steel, or are sintered, or are sometimes manufactured from malleable iron. The bearing shells are generally realized as so-called two or three layer bearings.

However, the constructive design of the plain bearing is in this respect significantly complicated, and a cost-intensive maintenance process furthermore becomes necessary with the exchanging of bearing shells. Furthermore, the manufacture of such bearing shells is relatively complex in effort and cost. For high operational performance of the machine, the bearing shells prematurely wear out so far that the exchange of the bearing shells becomes necessary, wherein, as described above, the exchange of the bearing shells in such machines involves high cost.

However, the premature wear of bearing parts, this means, for example, the wear of the balls of the ball bearing, of an axle supported by the ball bearing, of a cage for the balls of the ball bearing, or of other bearing parts, is also a principle problem for other types of bearings, for example, ball bearings, which entails considerable demand in effort for repairs and maintenance and ultimately involves considerable cost.

To solve these and further problems, a spray powder for manufacturing a bearing layer on a bearing part by means of a thermal coating method is suggested in EP 1 637 623 B1, which spray powder contains up to 30% zinc, up to 10% tin, up to 3% silicon, up to 7% aluminum, up to 2% iron, up to 4%, up to 3% cobalt, with the remaining difference to 100% being copper. In this respect all values are in weight percent.

A spray powder is hence provided by EP 1 637 623 B1 by means of which a copper-containing surface layer can be applied to a bearing part by a thermal coating method, so that the problems associated with white metal coatings, which are, for example, applied via centrifugal casting, can likewise be avoided, like the problems with complex divided bearings having bearing shells.

The essential elements of the spray powder in accordance with EP 1 637 623 B1 are in this respect on the one hand, iron cobalt, manganese, and silicon, which precipitate in the form of a hard phase as intermetallic phases or connections in the sprayed layer on cooling, so that isolated regions are generated in the layer that form spatially isolated hard phases of intermetallic phases or forms connections of iron cobalt, manganese, and silicon. The hard phases form relatively hard regions, i.e. areas with greater hardness in the otherwise comparatively soft copper-containing base matrix, which is substantially composed of copper, aluminum, and zinc, and thus form a copper-aluminum zinc-base matrix that forms a soft copper-containing base matrix relative to the enclosed areas of the hard phases.

Although the sprayed bearing layers formed from the spray powder in accordance with EP 1 637 623 B1 have proven excellent mechanical properties in operation, it has unfortunately also been shown that at least for certain applications the zinc content can lead to zinc abrasions arriving in the lubricant lubricating the bearings, which, amongst other things, depending on the chemical composition of the lubricant used, can lead to a type of zinc-contamination of the lubricant and can thus negatively influence its properties. Furthermore, the manufacture of the spray powder in accordance with EP 1 637 623 B1 is somewhat complex and in this respect expensive due to its relatively complicated composition.

For this reason it is the object of the invention to improve the sliding properties of a surface of a bearing part through the application of a thermal spray layer and to suggest an improved bearing apparatus which is simple from a construction point of view and which, in particular avoids the problems associated with zinc abrasion known from the state of the art. Correspondingly, it is a further object of the invention to make available a thermal spray powder having an as simple as possible chemical composition by means of which such a bearing layer is manufacturable on a bearing part.

The subject matter of the invention satisfying this object is characterized by the features of the independent claim of the respective category.

The respective dependent claims relate to particularly advantageous embodiments of the invention.

The invention therefore relates to a zinc-free powder for the thermal coating of a substrate, in particular to the thermal coating of a bearing part of a bearing apparatus, which spray powder has the following composition except for an avoidable contaminants: tin=5% to 30% weight percent; aluminum=0.1% to 5% weight percent; iron at most 1% weight percent; and copper=difference to 100% weight percent.

A second essential feature of the spray powder in accordance with the invention is the relatively high tin content.

In accordance with the invention, a spray powder is therefore made available by means of which a copper-containing surface layer can be applied to a substrate by means of a thermal coating method.

In this respect it is crucial, on the one hand, that the spray powder in accordance with the invention does not contain any zinc, so that the damaging effects of zinc-containing surface layers known from the state of the art are avoided. In particular, the zinc-contamination of the lubricant through zinc abrasion can therefore not occur at all which, as mentioned in the introduction, is, for example, often caused by zinc-containing surface layers of oil lubricated bearing parts.

A second important feature is a tin content of from 5% to 30% weight percent in connection with a relatively small aluminum proportion, which lies between 0.1% to at most 5% weight percent.

In this respect, it is known in principle that aluminum, on the one hand, can have a strong positive influence on the mechanical properties and can, in particular significantly improve the resistance to corrosion of a thermal spray layer. For this reason, one has so far assumed that a relatively high aluminum content is necessary in order to be able to guarantee a good resistance to corrosion of the thermal spray layer in the state of the art. However, on the other hand, it has also been shown that a high portion of aluminum in the thermal spray layer can lead to a formation of aluminum oxide (predominantly $Al_2O_3$) in the thermal spray layer in an increased quantity during the thermal spraying which in turn negatively influences the friction properties of the thermal spray layer.

A further finding of the invention consists therein that, for a high aluminum content in the spray powder, an aluminum matrix can form in the thermal spray layer, in which isolated tin phases can be more or less distributed. Due to the relatively high cooling rates and solidification rates during thermal spraying, a part of the tin can precipitate in a saturated solution in the aluminum matrix. The rest of the tin is then present in the form of particles with subcritical sizes, thus they are present in the form of particles which are formed in too small of a size in the aluminum matrix, so that the so-called anti-scuffing properties of the layer are influenced negatively, which means that the sliding partners which rub against one another, for example, the sliding part-tiers of a bearing, show an increased tendency towards scuffing which must naturally be prevented for obvious reasons.

On the other hand, a high tin content can significantly improve the anti-scuffing properties of the thermal spray layer, so that a thermal spray layer is finally enabled by means of the spray powder in accordance with the invention which spray powder simultaneously optimizes all significant properties of a thermally sprayed surface layer, in particular of a thermally sprayed bearing layer. In this respect the tin content may, however, not exceed a presettable limit, since the thermal spray layer would otherwise mechanically wear too quickly.

This means that the combination of a relatively low aluminum content of between 0.1% and at most 5% weight percent with a zinc content of at least 5% to at most 30% weight percent in accordance with the invention leads to a thermal spray powder by means of which thermal spray layers can be manufactured which, for the first time, simultaneously optimizes not only the anti-scuffing properties of the thermal spray layers, and the resistance to corrosion, but also optimizes the friction properties, thus optimizes an as small as possible friction coefficient of the thermal spray layer. One of the significant findings of the invention is in this respect that a relatively small proportion from 0.1% to 5% weight percent of aluminum already suffices to, on the one hand, guarantee a sufficient resistance to corrosion in the thermal spray layer in the composition of the spray powder in accordance with the invention with the formation of undesired aluminum oxide (predominantly $Al_2O_3$) being simultaneously suppressed to a sufficiently small degree.

For a preferred embodiment of a spray powder in accordance with the invention, the spray powder includes between 15% and 25% weight percent tin, preferable 20% weight percent tin.

In this respect the spray powder can specifically include between 0.5% and 2% weight percent aluminum, preferably 1% weight percent aluminum and/or at most 0.5% weight percent iron, preferably at most 0.2% weight percent iron. In this respect iron can be absent up to marginal unavoidable quantities in a special embodiment.

In practice the size of the particles of the spray powder lies between 5 µm and 120 µm, preferably between 10 µm and 60 µm, and depending on the application can also lie between 60 µm and 120 µm for example.

In this respect, a spray powder in accordance with the invention can be manufactured in a manner known per se, for example, by gas atomization, water atomization, sintering, spray drying, mechanical alloying or manufactured in any other suitable manner.

The invention further relates to a zinc-free layer system applied via thermal spraying. The layer system in this respect includes at least one surface layer, particularly a bearing layer of a bearing part of a bearing apparatus, which bearing layer has the following composition except for unavoidable contaminants: tin=5% to 30% weight percent; aluminum=0.1 percent to 5% weight percent; iron at most 1% weight percent, and copper=difference from 100% weight percent.

The surface layer of a layer system in accordance with the invention can in this respect include between 15% to 25% weight percent tin, preferably 20% weight percent tin, and/or the surface layer can include between 0.5% and 2% weight percent aluminum, preferably 1% weight percent aluminum, and/or the surface layer includes at most 0.5% weight percent iron, preferably at most 0.2% weight percent iron. In special cases, iron can also be completely absent except for unavoidable contaminants. Incidentally, for example, unavoidable quantities of various oxides or unavoidable remnants of process gases, such a noble gases, nitrogen and so forth can also be present in a layer system in accordance with the invention which, for example, can result via the thermal spray process, with the surface layer, having e.g. a porosity of from 0.5% to 5% volume percent, particularly between 1% and 3%.

In an embodiment important in practice a layer system in accordance with the invention can additionally include an outer top layer including tin which can preferably be provided directly on the zinc-free surface layer made of the sprayed powder in accordance with the invention, wherein, in a particularly important embodiment, the outer top layer only contains tin except for unavoidable contaminants. The outer top layer in this respect can in special cases be a running-in layer having a function known per se, which at least partially changes or alternatively wears out during the running-in process known in the art, in which, for example, the counter running-partners of a bearing are geometrically ideally tuned to one another or alternatively run in.

The invention finally also relates to a work piece, in particular to a connecting rod for a reciprocating piston internal combustion engine with a layer system as described in detail above, as well as to a spray method for the manufacture of a layer system in accordance with the invention on a work piece on use of a spray powder of the invention, in particular to manufacture a surface layer on a bearing part of a bearing, wherein the spray method is a thermal spray method, in particular an atmospheric plasma spray method, a vacuum plasma spray method, a HVOF-process, a flame spray method or a cold glass spray method.

What is claimed is:

1. A zinc-free thermal spray coating powder consisting essentially of:
   15 to 25 wt % tin;
   0.1 to 5 wt % aluminum;
   at most 1 wt % iron; and
   remainder copper.

2. The powder of claim 1, wherein:
   tin is 20 wt %.

3. The powder of claim 1, wherein one of:
   aluminum is 0.5 to 2 wt %; or
   aluminum is 1 wt %.

4. The powder of claim 1, wherein one of:
   iron is at most 0.5 wt %; or
   iron is at most 0.2 wt %.

5. The powder of claim 1, wherein said powder has a particle size of one of:
   between 5 µm and 120 µm; or
   between 10 µm and 60 µm.

6. A method of making the powder of claim 1, wherein said method comprises:
   forming said powder via one of:
      gas atomization;
      water atomization;
      sintering;
      flash drying; or
      mechanical alloying.

7. A zinc-free layer system comprising:
   a surface layer consisting essentially of:
      15 to 25 wt % tin;
      0.1 to 5 wt % aluminum;
      at most 1 wt % iron; and
      remainder copper.

8. The layer system of claim 7, wherein the surface layer is one of:
   a bearing layer;
   a layer of a bearing part.

9. The layer system of claim 7, wherein:
   tin is 20 wt %.

10. The layer system of claim 7, wherein:
    aluminum is 0.5 to 2 wt %; or
    aluminum is 1 wt %.

11. The layer system of claim 7, wherein one of:
    iron is at most 0.5 wt %; or
    iron is at most 0.2 wt %.

12. The layer system of claim 7, wherein the surface layer has a porosity of one of:
    between 0.5 volume percent and 5 volume percent; or
    between 1 volume percent and 3 volume percent.

13. The layer system of claim 7, further comprising a top layer one of:
    comprising tin; or
    consisting essentially of tin.

14. A workpiece comprising the layer system of claim 7.

15. The workpiece of claim 14, wherein the workpiece is a piston connecting rod.

16. A method of thermal spraying the workpiece of claim 14, comprising:
    thermal spraying the powder of claim 1 onto the workpiece.

17. The method of claim 16, wherein the thermal spraying comprises one of:
    atmospheric plasma spraying;
    vacuum plasma spraying;
    HVOF spraying;

flame spraying; or cold gas spraying.

18. A zinc-free thermal spray coating powder for forming a coating layer, said powder comprising:
 a particle size between 5 μm and 120 μm; and
 a composition consisting essentially of:
  15 to 25 wt % tin;
  0.1 to 5 wt % aluminum;
  at most 1 wt % iron; and
  remainder copper.

* * * * *